Feb. 27, 1934.  W. H. D'ARDENNE  1,949,269
AUTOMOBILE DOOR CONSTRUCTION
Filed Aug. 10, 1932   2 Sheets-Sheet 1
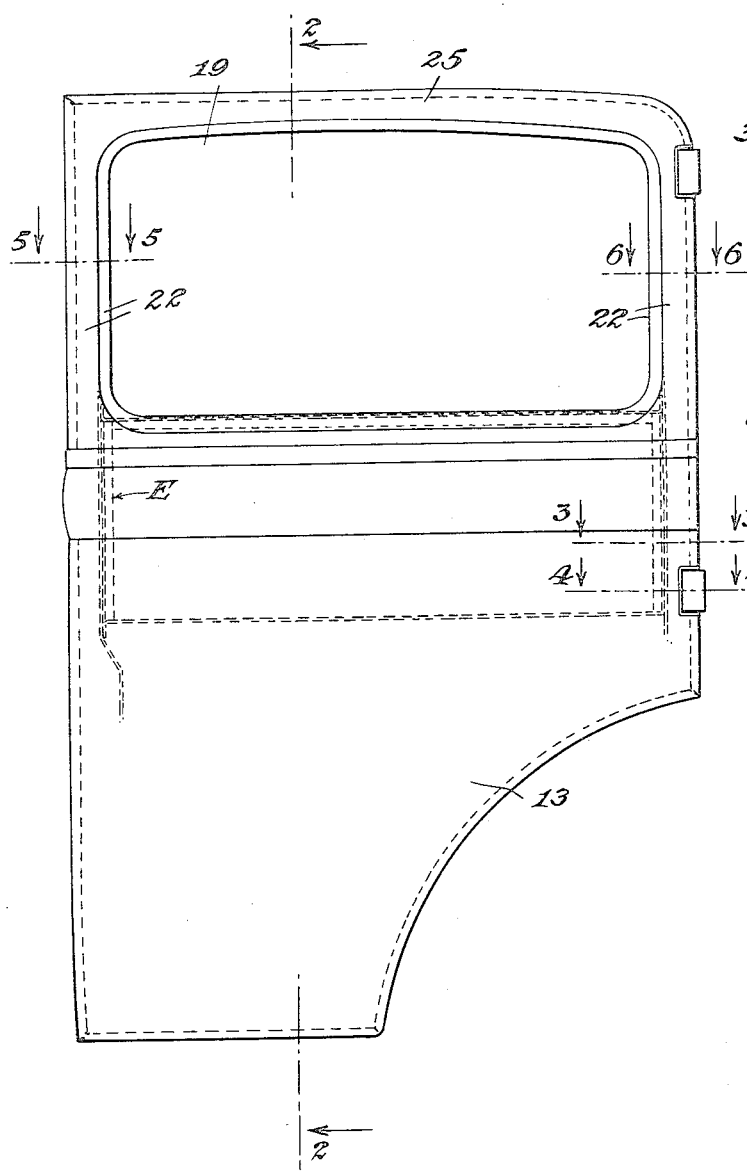
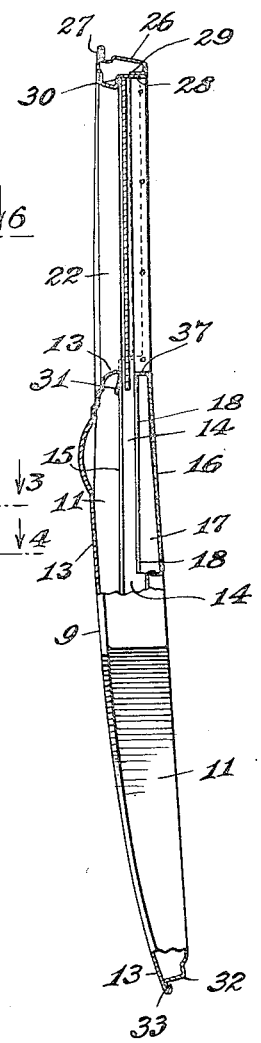
INVENTOR
Walter H. D'Ardenne
BY Henry Van Arsdale
his ATTORNEY Feb. 27, 1934.  W. H. D'ARDENNE  1,949,269
AUTOMOBILE DOOR CONSTRUCTION
Filed Aug. 10, 1932   2 Sheets-Sheet 2
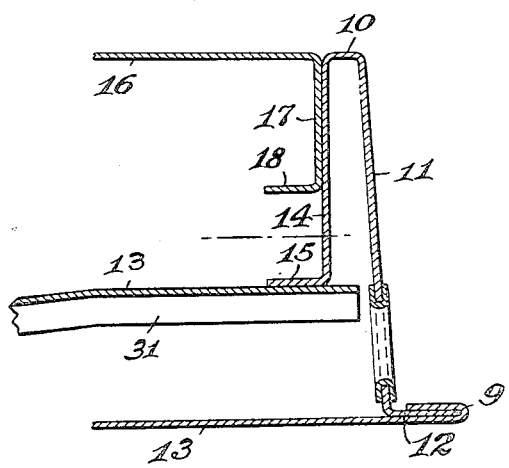
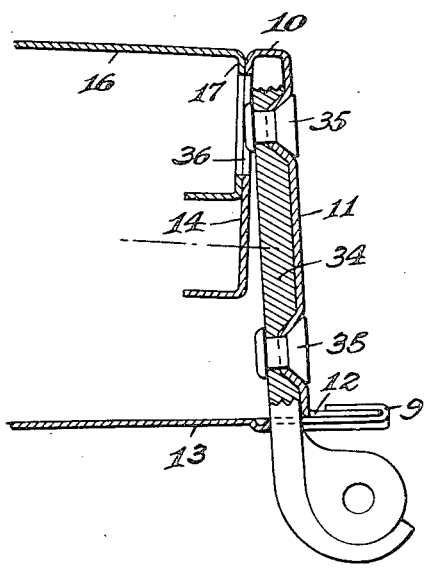
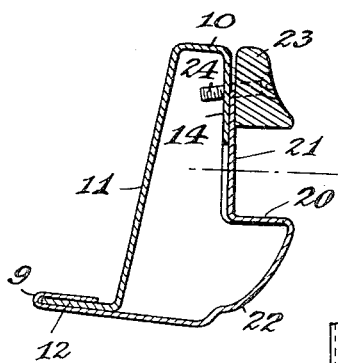
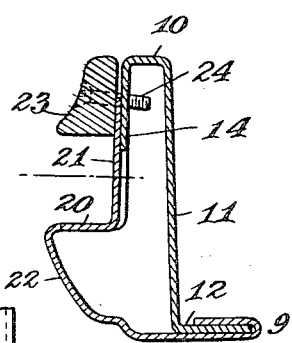
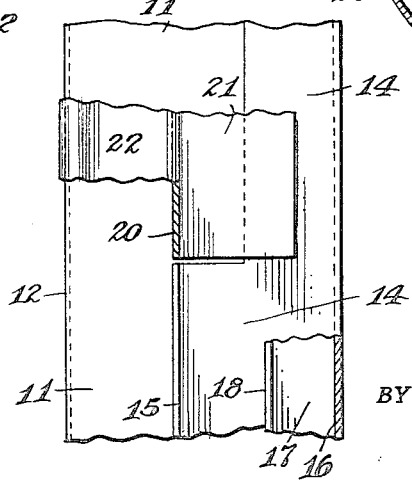
INVENTOR
Walter H. D'Ardenne
BY Henry Van Arsdale
ATTORNEY Patented Feb. 27, 1934

1,949,269

UNITED STATES PATENT OFFICE 1,949,269

AUTOMOBILE DOOR CONSTRUCTION

Walter H. D'Ardenne, Jenkintown Manor, Pa., assignor to Heintz Manufacturing Company, Philadelphia, Pa., a corporation of Pennsylvania Application August 10, 1932. Serial No. 628,139

11 Claims. (Cl. 296—44)

This invention relates to automobile doors, and more particularly relates to doors for closed automobile bodies.

One of the principal objects of the invention is to provide an improved and simplified manner of forming the glass run channel for a sliding window in such a door.

Another object of this invention is to provide an improved side pillar which is extremely sturdy, rigid and durable, and at the same time light in weight, and provides a portion of the glass run channel, and whereby the construction is simplified and lightened, and whereby a saving of material and in cost of construction is effected.

A further object of this invention is to provide an automobile door of simplified construction, light in weight, and at the same time strong and rigid, and a door which is pleasing and attractive in appearance.

Other objects of this invention will be in part obvious and in part pointed out hereinafter.

In accordance with this invention, each of the side pillars is formed to provide one of the glass run walls below the window opening, and here the glass run on each side of the door is completed by a complementary glass run wall formed on a lock board or panel which extends between and is supported by the side pillars. Along each side of the window opening a panel member is associated with each side pillar to produce a tubular formation which is sufficiently strong and rigid so as to require no internal reinforcement. These panel portions supply the continuation of the glass run wall of the side pillars, and coacting glass run members are secured to the side pillars to complete the glass run channel on each side of the window opening.

In order that a clearer understanding of this invention may be had, attention is hereby directed to the accompanying drawings, forming a part of this application, and illustrating certain possible embodiments of this invention, and in which:

Fig. 1 is a front view of a door embodying this invention; Fig. 2 is a sectional view thereof and is taken on the line 2—2 of Fig. 1; Figs. 3, 4, 5 and 6 are each an enlarged detailed sectional view through the edge of the door at different places, and are taken respectively on the lines 3—3, 4—4, 5—5 and 6—6 of Fig. 1, and Fig. 7 is an enlarged fragmentary view of a detail of the construction, some of the parts being shown in section and others being broken away. Similar reference characters refer to similar parts throughout the several views of the drawings.

Referring to the drawings, the side pillars are similar in formation, except each conforms to the configuration of the side of the door at which the pillar is located, and suitably adapted to the latching mechanism on one side of the door and to the hinges and door check on the other side of the door.

Each pillar is of channel shape in transverse cross section, having the base 10 of the channel presented at the inner side of the door. The outer wall 11 of each pillar defines the door edge, and at its end has an attachment flange 12 directed at an angle to the wall 11 and outwardly of the channel. The outside panel 13, which may be provided in one piece or in a plurality of separate pieces, has its opposite side edges clinched around and secured to the attachment flanges 12 of the side pillars.

The outer edge of the other channel wall 14 is formed with a glass run flange 15 which extends at an angle to the wall 14 toward the center of the door, that is, away from the channel of the pillar. A lock board or rear panel 16 extends between the opposite side pillars and has at each side edge an attachment flange 17 abutting and secured to the wall 14 of the adjacent side pillar, and has a glass run flange 18 extending from the flange 17 at an angle thereto toward the center of the door, and is spaced from the glass run flange 15 on the side pillar so as to define therewith a glass run channel, the base of the channel being that portion of the wall 14 which is between the glass run flanges 15 and 18. The top end of the glass run flanges 15 and 18 terminate approximately level with the bottom of the window opening 19 in the door, and above this point the wall 14 of the side pillar is of less depth than is that portion of the wall 14 which is provided with the glass run flange 15.

The shape of the outer paneling at the sides of the window opening is most clearly shown in Figs. 5 and 6. The panel member which is here secured to each side pillar is formed with a glass run surface 20 which at the bottom of the window opening meets or comes close to the top end of the glass run flange 15 of the side pillar with which the panel member is associated, and is in longitudinal alignment with this flange. Thus the glass run surface 20 and the flange 15 of the pillar together form a continued side wall of a glass run channel extending along the window opening at each side of the door.

Extending at an angle from one edge of the glass run surface 20 of each panel member is an attachment flange 21 which has a portion lapping and secured to the wall 14 of the side pillar, and each panel member has a panel surface 22 extending from the other edge of its glass surface 20, covering the channel of the side pillar and clinched and secured along its edge 9 to the attachment flange 12 of the side pillar, the pillar and panel member thus completing a tubular rail formation. A separate glass run member 23 may be secured to each side pillar, as by attachment screws 24, to complete the glass run channel along the sides of the window opening. The members 23 may be of any conventional or standard construction.

As shown, the form of paneling just described may be continued across the top of the window opening, as at 25, although, if desired, a separate top panel member may be provided. The top rail 26 is of channel shape in cross section, having an attachment flange 27 about which one edge of this paneling 25 is clinched, the other edge 28 of the paneling lapping and being secured to the wall 29 of the rail. The glass channel at the top of the door may be completed by securing to the top rail a member similar to the member 23 and so that such member and the glass run surface 30 of the paneling will define the glass run channel.

At the bottom of the opening the paneling has a downwardly extending flange 31 and, preferably, a complementary member, similar to member 23, is secured across the bottom of the window opening on the opposite side of the glass run. This member, similar to member 23, may be supported on and secured to a flange 37 formed on and extending across the top of the panel or lock board 16.

A suitable rail 32 extends across the bottom of the door, and, preferably, has the lower edge of the paneling 13 clinched about an attachment flange 33 of this rail.

The hinge arms 34 may be seated in the channel of the side pillar against the wall 11 thereof, and may be secured thereto by rivets, such as 35. Preferably the rivet holes are countersunk so that the heads of the rivets will be flush with the edge of the door, and the pillar wall 11 is deformed to seat in the countersinks beneath the rivet heads, as shown in Fig. 4. The attachment flange 17 of the panel member 16 and the wall 14 of the side pillar may be suitably apertured as at 36 to provide access to the rivets 35.

From the above description the improvements and advantages obtained by this invention will be readily apparent. The provision of the glass runs below the window opening by flanges formed on the side pillars and the lock board eliminates the necessity of providing separate and additional parts to form this portion of the glass run, as has been customary heretofore. Furthermore, these glass run flanges may be struck up when the pillars and lock board are stamped or pressed to shape. Thus their formation entails no additional labor. The channel pillars, with the tubular rail formation along the window opening are sufficiently sturdy and rigid without internal reenforcements, and are light and simple in construction. It is obvious that in a door embodying this invention the construction is simplified, and the door is reduced in weight without sacrificing strength or rigidity, and that there is a saving of material and of time and expense in construction and assembly, as well as other advantages and improvements which will be readily apparent to those familiar with steel automobile door construction.

As many changes could be made in the above construction and as many apparently widely different embodiments of this invention could be made without departing from the scope thereof, it is understood that all matter contained in the above description or shown in the accompanying drawings, shall be interpreted as illustrative and not in a limiting sense.

What I claim is:

1. In a door, in combination, opposite side pillars, each having a glass run flange extending toward the center of the door, and a panel having attachment flanges, one at each side, abutting and secured to the opposite side pillars and having a glass run flange extending from the edge of each attachment flange, and spaced from the glass run flanges of the pillars, the glass run flanges of the pillars and panel defining glass run channels at opposite sides of the door.

2. In a door, in combination, opposite side pillars of channel shape in cross-section, each having a glass run flange extending toward the center of the door, and a panel having attachment flanges, one at each side, abutting and secured to the opposite side pillars and having a glass run flange extending from the edge of each attachment flange, and spaced from the glass run flanges of the pillars, the glass run flanges of the pilars and panel defining glass run channels at opposite sides of the door.

3. In a door, in combination, opposite channel side pillars having the base of the channels toward the inner face of the door and each having a glass run flange extending from the edge of the inner channel wall toward the center of the door, a panel having attachment flanges along its side edges abutting and secured to said inner channel walls of the side pillars, and a glass run flange extending from the edge of each attachment flange, spaced from the glass run flanges of the pillars and defining glass run channels therebetween at opposite sides of the door.

4. In a door, in combination, opposite side pillars, each having a glass run flange extending toward the center of the door, and a panel having attachment flanges, one at each side, butting and secured to the opposite side pillars and having a glass run flange extending from the edge of each attachment flange and spaced from the glass run flanges of the pillars, the glass run flanges of the pillars and panel defining glass run channels at opposite sides of the door, said side pillars extending below the lower edge of the panel.

5. In a door, in combination, opposite side pillars, each having a glass run flange extending toward the center of the door, and a panel having attachment flanges, one at each side, abutting and secured to the opposite side pillars and having a glass run flange extending from the edge of each attachment flange, and spaced from the glass run flanges of the pillars, the glass run flanges of the pillars and panel defining glass run channels at opposite sides of the door, said side pillars extending above and below said panel, and defining the sides of a window opening above the panel.

6. In a door, in combination, opposite side pillars, each having a glass run flange extending toward the center of the door, and a panel having attachment flanges, one at each side, abutting and secured to the opposite side pillars and having a glass run flange extending from the edge of each attachment flange, and spaced from the glass run flanges of the pillars, the glass run flanges of the pillars and panel defining glass run channels at opposite sides of the door, said side pillars extending above the top of said panel, and the glass-run flanges of the pillars terminating at approximately the level of the top of said panel.

7. In a door, a combination, opposite side pillars, each having a glass run flange extending toward the center of the door, and a panel having attachment flanges, one at each side, abutting and secured to the opposite side pillars and having a glass run flange extending from the edge of each attachment flange and spaced from the glass run flanges of the pillars, the glass run flanges of the pillars and panel defining glass run channels at opposite sides of the door, said side pillars extending above and below said panel and defining the sides of a window opening above the panel, and the glass run flanges of the pillars terminating at approximately the level of the top of said panel.

8. In a door, in combination, opposite side pillars, each having a glass run flange extending toward the center of the door, and a panel having attachment flanges, one at each side, abutting and secured to the opposite side pillars and having a glass run flange extending from the edge of each attachment flange and spaced from the glass run flanges of the pillars, the glass run flanges of the pillars and panel defining glass run channels at opposite sides of the door, said side pillars extending above and below said panel and defining the sides of a window opening above the panel, the top of said panel defining the bottom of said window opening, the upper ends of the glass run flanges of the pillars and panel terminating approximately at the level of the bottom of said window opening.

9. In a door having a window opening and a closed portion below the window opening, in combination, opposite side pillars extending along and below the window opening, each pillar having a glass run flange extending toward the center of the door, the upper end of each flange being approximately level with the bottom of the window opening, and a panel member secured to each pillar, each member having a glass run surface above the upper edge of the glass run flange of one of said pillars and in longitudinal alignment with said flange, said glass run flanges and glass run surfaces forming together a continued glass run side wall extending above and below the bottom of the window opening, and a panel extending between and secured to said pillars below the window opening and having a glass run flange at each side so positioned as to define a glass run channel between it and the glass run flange of the pillar at the same side of the panel.

10. In a door having a window opening and a closed portion below the window opening, in combination, opposite side pillars extending along and below the window opening, each pillar having a glass run flange extending toward the center of the door, the upper end of each flange being approximately level with the bottom of the window opening, and a panel member secured to each pillar, each member having a glass run surface above the upper edge of the glass run flange of one of said pillars and in longitudinal alignment with said flange, said glass run flanges and glass run surfaces forming together a continued glass run side wall extending above and below the bottom of the window opening, and a panel extending between said pillars and having at each side an attachment flange abutting and secured to the pillar at that side and having a glass run flange extending from each attachment flange toward the center of the door and spaced from the glass run flange of the pillar at that side, the said glass run flanges of the pillars and glass run flanges of the panel defining between them a glass run channel at each side of the door.

11. In a door having a window opening and a closed portion below the window opening, in combination, opposite side pillars extending along and below the window opening, each pillar having a glass run flange extending toward the center of the door, the upper end of each flange being approximately level with the bottom of the window opening, and a panel member secured to each pillar, each member having a glass run surface above the upper edge of the glass run flange of one of said pillars and in longitudinal alignment with said flange, said glass run flanges and glass run surfaces forming together a continued glass run wall extending above and below the bottom of the window opening, a panel extending between said pillars and having at each side an attachment flange abutting and secured to the pillar at that side and having a glass run flange extending from each attachment flange toward the center of the door and spaced from the glass run flange of the pillar at that side, the said glass run flanges of the pillars and glass run flanges of the panel defining between them a glass run channel at each side of the door, and a separate glass run member secured to each pillar at the sides of the window and having a glass run surface so positioned relatively to the glass run surface of each of said panel members as to complete the glass runway at the sides of the window opening.

WALTER H. D'ARDENNE.